July 26, 1949.　　　　V. L. ILES　　　　2,476,982

ROLLING CONTACT BEARING

Filed Aug. 25, 1945

INVENTOR.
VIRGIL L. ILES
BY
　　　ATTORNEYS

Patented July 26, 1949

2,476,982

UNITED STATES PATENT OFFICE 2,476,982

ROLLING CONTACT BEARING

Virgil L. Iles, Batavia, Ohio

Application August 25, 1945, Serial No. 612,699

1 Claim. (Cl. 308—193)

(Granted under the act of March 3, 1883, as amended April 30, 1928; 370 O. G. 757)

The invention described herein may be manufactured and used by or for the Government for governmental purposes without payment to me of any royalty thereon.

This invention relates to a rolling contact bearing for shafts and the like and the principal object thereof being to provide means whereby a constant bearing clearance is maintained by the rolling contact elements when the bearing is operating at elevated or high temperatures.

In devices of this type, considerable difficulty has been experienced in that the bearing clearance is always subject to change when the device is in use since the metals used in forming the bearing expand and contract according to operating temperatures. With this in view, it is proposed to construct a rolling contact bearing in such a manner as will hereinafter be described whereby the variations in expansion and contraction of the metals used in forming the bearing, due to temperature conditions, are compensated for by the materials used in the manufacture of the bearing.

The advantage of a rolling contact bearing constructed in accordance with this invention is that a minimum variation in clearance of the rolling contact elements of the bearing is obtained throughout a wide range of operating temperatures.

With the foregoing and other objects in view the invention resides in the new and novel combination and details of parts hereinafter set forth in the following specification and appended claims, certain embodiments thereof being illustrated in the accompanying drawing:

Figure 1:
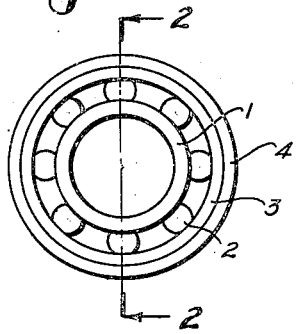
Figure 1 is a side elevation view of the general design of the bearing made in accordance with my invention.
Figure 2:
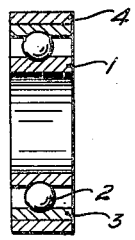
Figure 2 is a sectional view taken on line 2—2 of Fig. 1.
Figure 3:
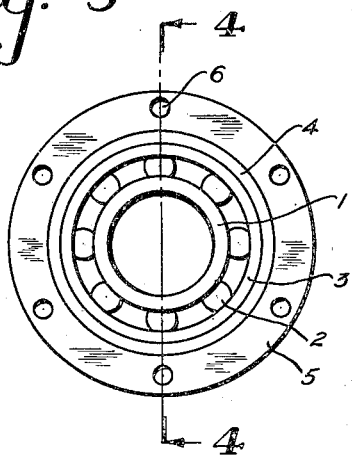
Fig. 3 is a side elevation view of a bearing made in accordance with my invention showing a flange mounted externally of the bearing structure for securing same in place.
Figure 4:
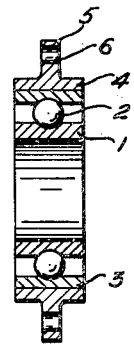
Fig. 4 is a sectional view taken on line 4—4 of Fig. 3.

When the usual bearing installation is in use, friction heat is generated in the bearing which causes the metals used in forming the bearing to expand, some parts of the bearing expanding more than other parts thereby reducing the clearance between the rolling contact elements and the bearing race causing a tightening up of the bearing and reducing the efficiency thereof. It is well known that the outer race of a conventionally mounted rolling contact bearing has the advantage over the inner race of better load distribution over a greater area as well as better heat dissipation due to its contact with the bearing housing, and that it therefore expands less, under the same heat condition, than the inner race. To maintain the same running freedom, however, the outer race must expand more than the inner race since the outer race must compensate for the expansion of the inner race and the rolling contacts put together. Heretofore, in the usual bearing installation, the rolling contact elements were given appreciable clearance within the inner and outer race members of the bearing when assembled in order to insure free rolling contact of the rolling elements when the bearing was there after operated at high speeds and friction heat generated, thereby expanding the metals of the inner race to a greater extent than the outer. If proper clearance was not provided for at the time of assembly of the bearing, the bearing, when operated at high temperatures, would tighten up due to the unequal expansion of the races and causing the bearing to operate inefficiently.

The novel feature of this invention resides in the utilization of a suitable metal for forming the outer ring member of the bearing which has a higher co-efficient of expansion with respect to temperatures than the metal used in the construction of the outer race member forming a part of the bearing made in accordance with my invention. The same result can be obtained by utilizing a metal for forming the outer ring member whose tensile strength, when subjected to high temperatures, decreases more rapidly than does the tensile strength of the metal used for forming the outer race member of the bearing made in accordance with my invention.

Referring more particularly to the drawing, I denotes an inner ring member formed of any suitable bearing surface material such as steel and 2 is a series of rolling contact elements which can be either steel balls, rollers or any other suitable form of rolling contact elements. 3 is an outer race member for the rolling contact elements 2 which is also made of steel or other hard rolling contact surface. 4 denotes an outer ring member constructed of a material that has a higher co-efficient of expansion, with respect to temperatures, than the steel which is used for forming parts 1, 2 and 3. Ring 4 is shrunk-fitted over parts 1, 2 and 3 during assembly in a manner hereinafter described and is constructed of bronze or other metal having a higher co-efficient of expansion when subjected to high temperatures than the steel used in the construction of the bearing for a purpose hereinafter more fully described.

The bearing is assembled in the following manner. Inner race member 1 and rolling contact elements 2 are subjected to low temperatures whereby same is caused to contract, and outer race member 3 is subjected to high temperatures causing same to expand. With the parts 1 and 2 thus contracted, and parts 3 expanded, the rolling contact elements 2 are fitted within the inner and outer race members and the bearing is then allowed to cool, whereupon the metals will be restored to their natural size. When the parts have thus been assembled, the inner and outer race members 1 and 3 will form a bearing race for the rolling contact elements 2. At this stage there should be a predetermined looseness of the rolling contact elements in the assembled race members.

The outer ring member 4 is placed over the outer race member 3 in the following manner. Parts 1, 2 and 3 are again subjected to low temperatures, thereby causing the metals to contract and when in that condition, ring 4 is subjected to a high temperature, thereby causing it to expand and, when the parts are thus contracted and expanded, ring 4 is placed over the outer race element 3 and the bearing allowed to cool, whereupon the metals will return to their normal sizes. The cooling of the bearing will cause ring 4 which was expanded by heat treatment to contract and shrink-fit over the outer race member 3. Likewise, the inner and outer race members and rolling contact members which had been subjected to low temperatures and caused to contract will expand when subjected to normal temperatures and return to their normal size. The shrinking of the ring member 4 over the race member 3 will contract the race member to take up the predetermined looseness. With the bearing thus assembled, it will be noted that the shrinking of ring 4 over parts 1, 2 and 3 has reduced the race 3 to a diameter which provides proper clearance between these parts. This clearance will remain substantially unchanged under a wide range of temperature conditions in a manner hereinafter described.

When the bearing is in use, heat is generated in the region of parts 1, 2 and 3 but because of the better load distribution and better heat dissipation of race member 3 the parts 1 and 2 will operate at a higher temperature than part 3. Since parts 1, 2 and 3 are made of steel which has a common co-efficient of expansion, parts 1 and 2 operating at the higher heat will tend to expand more than the part 3. In the usual bearing installation, this condition will reduce the clearance between parts 1, 2 and 3, thereby causing the bearing to tighten up. In my invention, however, the outer ring 4, which is now holding the outer race 3 contracted is constructed of a metal which has a higher co-efficient of expansion than the inner and outer race member of the rolling contact elements and the heat generated in the bearing when operating at high temperatures, will be dissipated through the outer race member to the ring member 4. The shrink-fit of ring member 4 on outer race member 3 compresses to some extent the metal used in forming outer race member 3 so that when heat is generated within the bearing when operating at high temperatures, race member 3 will expand outwardly against the action of ring member 4 shrunk-fitted thereon.

Since the ring member 4 has a higher co-efficient of expansion with respect to temperatures than does the outer race member 3 the heat generated in the bearing when in use will cause expansion of the ring 4 which will partially relieve compression on outer race member 3. By providing a bearing with an outer ring 4 constructed of a material having a higher co-efficient of expansion than the metal used for forming the inner and outer race members and rolling contact elements of the bearing, the outer race member, when subjected to heat, will expand a greater degree than would be the case if it were not provided with the ring 4 shrunk-fitted thereon during assembly.

To further discuss the expansion of the outer race member 3 and the design of this invention, the expansion of the outer race member 3 is due to two factors: One, inherent elasticity of the metal used for forming the outer race member which tends to restore the part to its free or normal size upon partial relief of the compression caused thereon by the shrink-fit of the ring member 4 and, two, normal temperature expansion of the outer race member. Since the inner race member, outer race member and the rolling contact elements are constructed of a metal having a common co-efficient of expansion and since the ring member 4 is constructed of a metal having a higher co-efficient of expansion than the afore-mentioned parts, the heat generated by the bearing when in use will cause the parts to expand and since the outer race member 3 will be caused to expand to a greater degree due to the shrink-fit of the outer ring 4 thereon, a substantially constant clearance between the inner and outer race members and the rolling contact elements will be maintained under all conditions of use.

The same result can be obtained by forming ring 4 of a metal such as copper or aluminum whose tensile strength when subjected to high temperatures is reduced more rapidly than the tensile strength of the metal used for forming the inner and outer race member and rolling contact elements. In other words, the outer ring member 4 can be constructed of a metal whose tensile strength decreases more rapidly when subjected to high temperature than does the strength of the metal used for forming outer race member 3. In such a case, when the outer ring 4 is shrunk-fitted over the outer race member 3 it will initially compress the outer race member. However, when the bearing is in use and heat is generated thereby, the compression on the outer race member caused by the ring member will be partially relieved and the outer race member permitted to expand and increase in diameter for maintaining a constant bearing clearance.

To state the invention in another way, the outer race member 3 is made slightly oversize to allow a slight looseness between the races and the rotating contacts. The ring 4 is then shrunk on the race 3 so as to make the race 3 smaller to take up the looseness, whereby the bearing parts are closely fitted when cold. When the bearing is now put into operation, the inner race 1 and the contacts 2 get hotter than the outer race and ring 4, which would ordinarily cause the bearing to bind, but the ring 4, while it retains less heat, it has a greater coefficient of expansion, and therefore ring 4 expands and allows race 3 to expand as much as required by race 1 and the rolling contacts 2. Part of the expansion of race 3 is due to the heat it receives, and part is due to the relief of the pressure on its outside upon expansion of ring 4. The expansion of race 3 from both causes is equal to the expansion of race 1 and contacts 2 from heat only.

For securing the bearing a flange 5 provided with openings 6 can be made integral to the ring 4 or secured thereto in any other suitable manner.

I claim:

A rolling contact bearing comprising an inner race member, an outer race member, a plurality of rolling contact members normally fitted freely between the inner and outer race members, a ring of smaller inside diameter than the normal outside diameter of the outer race member surrounding said outer race member and compressing it to a smaller diameter to thereby fit the outer race member more closely to the contact members, said ring being made of a material which is subject to greater expansion at a given heat than the material of said outer race member, whereby, at high temperatures the ring will expand and allow the outer race member to expand correspondingly to compensate for any excess expansion of the inner race member and contacts over the normal expansion of the outer race member due to increased heat.

VIRGIL L. ILES.

REFERENCES CITED

The following references are of record in the file of this patent:

UNITED STATES PATENTS

| Number | Name | Date |
|---|---|---|
| 845,632 | Gurney | Feb. 26, 1907 |
| 1,146,272 | Neukirch | July 13, 1915 |
| 2,370,173 | Kendall | Feb. 27, 1945 |

FOREIGN PATENTS

| Number | Country | Date |
|---|---|---|
| 379,087 | France | Oct. 24, 1907 |
| 569,205 | France | Apr. 9, 1924 |